(12) United States Patent
Bell

(10) Patent No.: US 7,462,364 B2
(45) Date of Patent: Dec. 9, 2008

(54) REPELLANT/DETERRENCE SYSTEM FOR ANIMALS AND METHOD OF USE

(75) Inventor: Donald G. Bell, Furman, AL (US)

(73) Assignee: EBSCO Industries, Inc., Birmingham, AL (US)

( * ) Notice: Subject to any disclaimer, the term of this patent is extended or adjusted under 35 U.S.C. 154(b) by 743 days.

(21) Appl. No.: 10/758,425

(22) Filed: Jan. 16, 2004

(65) Prior Publication Data

US 2005/0158352 A1   Jul. 21, 2005

(51) Int. Cl.
*A01N 25/02*   (2006.01)

(52) U.S. Cl. .................. 424/405; 424/406; 514/920

(58) Field of Classification Search .............. None
See application file for complete search history.

(56) References Cited

U.S. PATENT DOCUMENTS

| 5,009,192 | A | 4/1991 | Burman |
|---|---|---|---|
| 5,458,093 | A | 10/1995 | MacMillan |
| 5,501,179 | A | 3/1996 | Cory |
| 5,603,287 | A | 2/1997 | Houck |
| 5,870,972 | A | 2/1999 | Zinter et al. |
| 5,892,446 | A | 4/1999 | Reich |
| 5,966,075 | A | 10/1999 | Blanks |
| 6,016,100 | A | 1/2000 | Boyd et al. |
| 2003/0058740 | A1* | 3/2003 | Jincks .................. 367/139 |

OTHER PUBLICATIONS

Martel—Life of PI ,pp. 198-205, 2001 Harcourt Books.*
Bennett dt al—Pest Control Operations, pp. 341-344, 1988.*

* cited by examiner

*Primary Examiner*—Neil Levy
(74) *Attorney, Agent, or Firm*—Smith, Gambrell & Russell LLP

(57) ABSTRACT

A system and method for repelling and deterring animals, and particularly deer, includes devices to trigger each of the animal's senses of taste, smell, sound, sight, and touch. When an animal's presence if sensed, each device is triggered in sequence, with the sequence capable of being changed to reinforce the repelling and deterring effect on the animal.

17 Claims, 2 Drawing Sheets

REPELLANT/DETERRENCE SYSTEM FOR ANIMALS AND METHOD OF USE

FIELD OF THE INVENTION

The present invention is directed to a repellant and deterrent system for animals and its method of use, and in particular to a system that affects all five senses of an animal to both repel animals and deter their return from an area.

BACKGROUND ART

The problems with a burgeoning deer population are well recognized in urban areas. An overabundance of deer creates problems in terms of both safety and cost. The high deer population has caused a number of car-deer collisions, which cost the car owner in terms of repair and society in terms of increased insurance premiums. The cost in landscape damage to homeowners, businesses, and commercial growers is tremendous.

The prior art has proposed a number of solutions to repel deer from areas. Products have been developed that are designed to treat/coat plants with a taste that is undesirable to deer. Other devices have been proposed that spray water at the deer when the deer's presence is sensed. Other devices uses sound or light to scare or repel deer. In many of these devices, some type of sensor is employed to detect the deer's presence. Once the sensor detects the deer, the appropriate action is taken to repel the deer from the targeted area.

The prior art devices are somewhat successful, but they are not foolproof in their deer repellency. For example, foul tasting product sprays are successful as long as the product remains on the plant. After a rain shower, the sprays can be washed off, so that the plants are unprotected from the deer. Devices that use sound, light or water also suffer from the fact that the deer can become used to the particular mode of repellency, and its effectiveness erodes over time.

Thus, there is still a need for improved devices and systems to repel animals from areas of concern. The present invention responds to this need with a system that appeals to all five senses of the animal to maximize the repellant and deterrent effect.

SUMMARY OF THE INVENTION

It is a first object of the present invention to provide a system that repels and deters animals from entering an area.

Another object of the invention is a system that uses the five senses of sight, sound, smell, taste, and hearing to repel and deter animals.

Another object of the invention is a method of repelling and deterring animals from entering an area wherein the animals' senses are triggered, and the sequence of the triggering of senses can change.

Other objects and advantages of the present invention will become apparent as a description thereof proceeds.

In satisfaction of the foregoing objects and advantages, the invention includes a method of repelling an animal from an area by first sensing the presence of an animal in an area, and then triggering the detected animal's senses of sight, sound, touch, smell, and taste in a predetermined sequence to repel the animal from the area and deter reentry of the animal into the area.

The animal's sense of touch can be triggered by directing a water and/or air spray at the animal. The animal's sense of sight can be triggered by shining a light in a direction of detection of the animal. The animal's sense of taste can be triggered by spraying foliage in or near the area with a foul-tasting substance. The animal's sense of hearing can be triggered by emitting sound in a direction of detection of the animal. The animal's sense of smell can be triggered by emitting a scent in a direction of detection of the animal.

The triggering step can be repeated in a different order if an animal's presence is detected within a predetermined period of time from an initial detection of an animal. Further detections of an animal with the predetermined period of time initial further sequences of triggering steps, each sequence involving a different order from a previous sequence.

Preferably, the method is intended to repel deer and the foul-tasting substance is a deer-hating substance, and the scent is a scent of an animal that is predatory to deer.

The invention also includes a system for repelling and deterring deer from an area that includes means for sensing the presence of an animal in an area; means for directing a water and/or air spray at the animal; means for directing a scent at the animal; means for directing light at the animal; means for spraying foliage in or near the area with a foul-tasting substance; means for directing sound at the animal, and means for controlling the directing and spraying means responsive to detection of an animal via the sensing means.

The controlling means can activate the various means in different sequences once an animal's presence is redetected within a predetermined period of time. The system can include a housing designed to be mounted at a location with all or part of each of the means of (a)-(f). The sensing means is preferably a motion detector and the scent directing means uses a predatory animal scent. When using the system to repel and deter deer from entering an area, the scent directing means can use a scent from an animal that is predatory to deer, and the foul-tasting substance can be a deer-hating substance.

BRIEF DESCRIPTION OF THE DRAWINGS

Reference is now made to the drawings of the invention wherein.

DESCRIPTION OF THE PREFERRED EMBODIMENTS

The present invention involves an animal repellant/deterrent system designed to both repel animals entering an area and deter reentry of the animals into the area. The aim of the invention is achieved by appealing to the five senses of the animal, sight, sound, smell, taste and touch. The animal's senses are triggered in a particular sequence to initially repel the animal. If the animal returns within a certain period of time, detection of this return changes the sequence of actions to repel the animal again and minimize the likelihood of the animal's return.

Since animals have natural defenses made up of the five senses of touch, sight, smell, sound, and taste, it is not always sufficient to alarm an animal by preying on only one of its senses. This is why the prior art systems that merely rely on one sensory trigger are somewhat deficient in their ability to keep animal consistently at bay. The invention's effectiveness involves alarming the animal and confirming the initial alarm with the animal's other senses. This simultaneous confirmation of the animal's various senses results in a desired effect of repelling the animal from the protected area.

The system is especially adapted for deer given their propensity for destroying vegetation and landscape. In this regard, the taste and smell actions preferably incorporate products that are deer-hating from a taste and smell standpoint.

Figure 1:
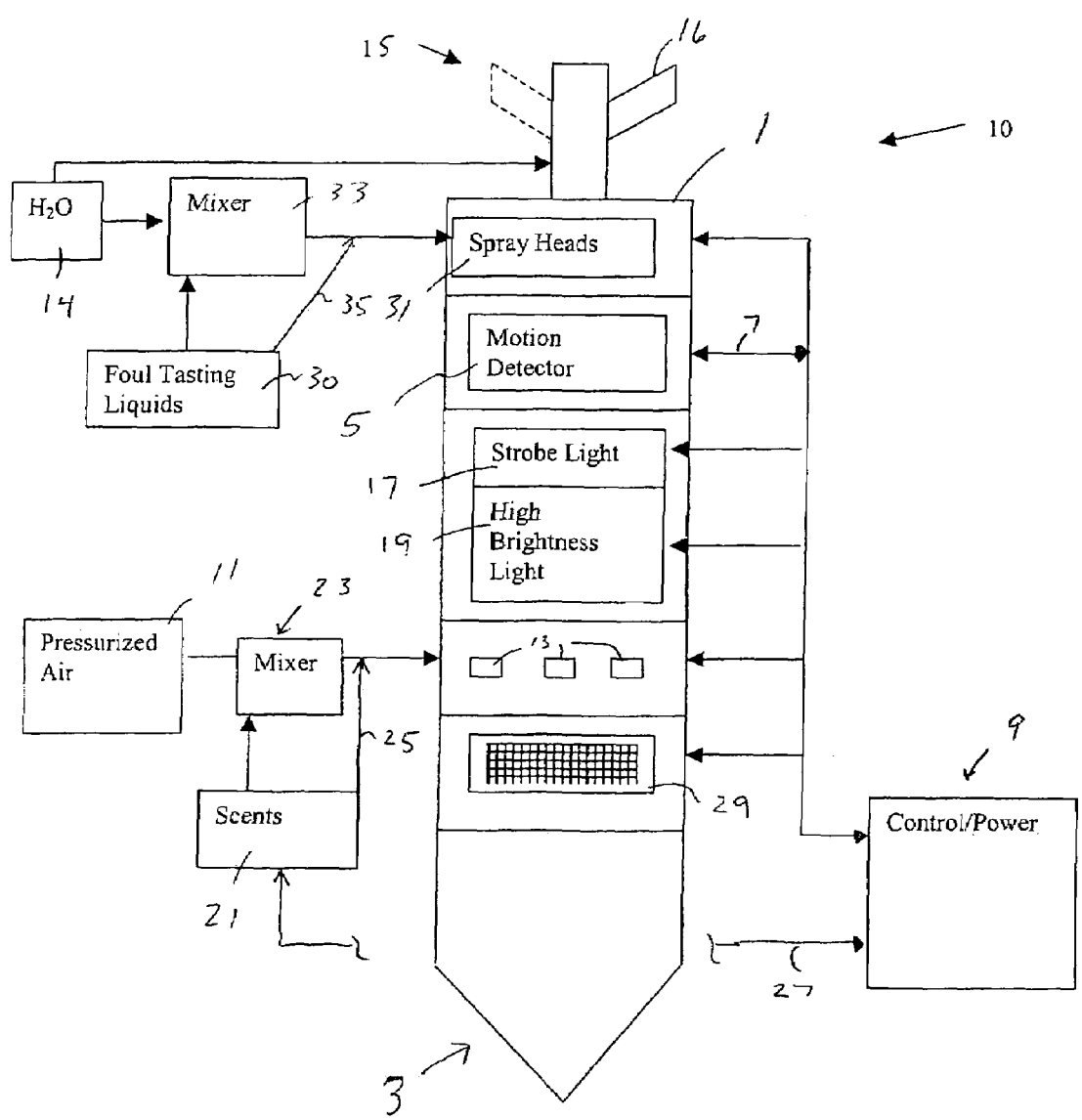
FIG. 1 shows a schematic arrangement of the components of an exemplary repellant/deterrent system.

FIG. 1 shows a schematic of one embodiment of the invention that identifies the inventive system by reference numeral 10. The system has a number of components, each relating to one of the senses that are triggered. The bulk of the system is contained in a housing 1 which has a stake end 3 for mounting into the ground at an area or location where it is desired to keep animals away. The location can be virtually any location where animals such as deer are unwanted, e.g., a garden, roadway, farmland, parks, etc. While a stake is shown, any other means can be used to secure the housing 1 at a particular location. For example, the housing could be mounted on a base that is, in turn, secured at a location. The housing can be made of any material, e.g., a polymer, and is intended to be waterproof to protect the various components from weather degradation.

The system 10 is shown in columnar design with the various components stacked vertically. However, the components could be configured horizontally or in a dual column design if so desired. A first component is a motion detector 5 using an infrared signal or the like, which is designed to detect the motion of an animal entering an area to be protected. Since these motion detectors are well known in the art, a further description is not need for understanding of the invention. Once the motion detector senses motion, a signal is sent via path 7 to a controller 9. The controller, as will be described later, then activates the components of the system to repel the animal whose presence was sensed by the motion detector 5. While a motion detector is shown, any device capable of detecting the presence of an animal in the target area can be employed to activate the system 10. One example would be the use of light and photodetectors if one is seeking to protect an area at night.

In a preferred mode, the first component activated by the controller 9 involves a means for triggering the animal's sense of touch by releasing either or both of pressurized air 11 through the ports 13 and water 14 through the sprayer 15. The controller 9 can be any type that would be capable of receiving a signal from the motion detector and directing a signal to the means for triggering the animal's sense of touch. Since these types of controllers are well known in the art, a further explanation of their details is not necessary for understanding of the invention. The sprayer 15 is depicted as an oscillating type with arm 16 moving back and forth to distribute the water over the target area. Of course, other types of sprays or distributors can be employed. The ports 13 are positioned in the housing 1 to provide coverage matching the sprayer 15. Although the target area can vary according to the range of the sprayer, ports, and motion detector, an exemplary area would be an arc extending 30 feet from the housing 1 and spanning 90-180 degrees. The spraying or distributing devices 13 and/or 15 can last any period of time, but a short period such as 3-5 seconds is preferred. In one mode, piping for the source of air and water can be routed to the sprayer 15 or ports 13 underground and through the stake 3 of the housing 1. Of course, other ways to bring the water and air into the housing can be employed as well, piping, external to the housing.

Once the animal's sense of touch has been triggered, a second component that is to be activated involves a means for triggering the animal's sense of sight. That is, a light such as a strobe 17 and/or a high intensity light 19 is activated by the controller 9 in the direction covered by the motion detector 5. As with the air/water spray, the light is activated for a set period of time, e.g., 5-10 seconds. Although a strobe 17 and high intensity light 19 are disclosed, other types or combinations of lighting can be used as part of the sequence of sensation triggers.

Following triggering the senses of touch and sight of the animal and termination of the lights 17 and/or 19, the air ports 13 as means for triggering the animal's sense of smell are activated by the controller 9 to direct one or more scents 21 in the direction of the animal. The scents 21 are preferred to be predatory scents known to scare the animal away. An example of such a scent would be mountain lion urine, which is available via the Internet. The scents can be in a liquid state that is then mixed at 23, e.g., using a venturi device, with the source of pressurized air. Alternatively, the pressurized scents 21 can be formulated so that they can be dispersed directly to the ports 13 via path 25. In yet another mode and although not shown, the scents could be mixed with water or other liquid for dispersal. Of course, the scents 21 can take other forms such as gas or powder and be dispersed in the direction of the animal using a device appropriate for the form of the scent. As with the means for triggering the animal's sense of sight and touch, the sense of smell is triggered with the dispersing of the scents 21. A number of different scents can be stored and selection of a scent can be predetermined, selected randomly, selected by a user, or selected using the controller 9 via path 27.

Following the triggering of the animal's sense of touch, sight, and smell, means for triggering the animal's sense of sound is provided by generating sounds using the outdoor speaker 29, and one more prerecorded sounds. The sounds can be stored in the housing 1 itself using analog or digital equipment, or in the controller 9 and supplied to the speaker when sounds are called for in the sequence of sensation triggering set by the controller 9. These sounds can be any type that would have a repelling effect on the animal, with preferred sounds being natural and predatory sounds. The sounds can be one type of a combination of different types at different intervals. The sound generation would last for a predetermined period of time, e.g., 3-5 seconds.

After the senses of touch, sight, smell, and sound have been triggered, a deer hating or foul tasting substance 30 can be dispersed using the spray heads 31 as the means for affecting the animal's sense of taste. These heads 31 are preferably pointed towards plants or other landscaping that is intended to be protected by the system 10. Typically, this direction will be generally opposite the direction monitored by the motion detector. However, the spray heads 31 could be directed in the direction monitored by the motion detector 5, if so desired. The foul tasting liquid can be mixed with the water 14 prior to spraying using mixer 33. As an alternative, the foul tasting liquid 30 could come in a form ready for spraying and be directed via path 35 to the spray heads 31. Of course, solids could also be used as the foul tasting substance, and dispersed in any appropriate fashion. The foul tasting substances as animal deterrents are well known substances that are readily available commercially, and any of these types of substances can be used with the inventive method and system.

Once the system detects an animal in the area being monitored and cycles through each of the touch, sight, smell, sound, and taste components, the system can go dormant. This initial triggering of the animal's senses may make the animal flee and not return, thus allowing the system to remain dormant for an extended period of time. However, natural curiosity in the animal may bring the animal back after the senses have been triggered.

If the animal should reenter the area being monitored after a short period of time, say only ten minutes, the controller 9 begins a new cycle of sensation triggering, and preferably in a different sequence than first employed. For example, the animal could be subjected to an order of triggering its smell, sound, touch, sight, and taste senses. If after ten minutes, an animal's presence is again detected, yet another order can be used, e.g., sound, touch, sight, smell, and taste. The controller 9 could be programmed that if the motion detection is activated within a certain period of time, the sequence is changed from the previous one. In another mode, the order of sensation triggering could stay the same, with the initial sensation becoming the last sensation. For example, after the initial sequence of touch, sight, smell, sound, and taste, a second sequence would begin with sight, followed by smell, sound, taste, and ending in touch. The sequence after that would be smell, sound, taste, touch, and sight. This sequence would continue to change if the animal were to return to the area being monitored.

If the animal does not quickly return, e.g. 20 minutes has elapsed, the controller 9 can reset the system to start on a default mode, such as that described above for the initial warning, touch, sight, smell, sound, and taste.

Figure 2:
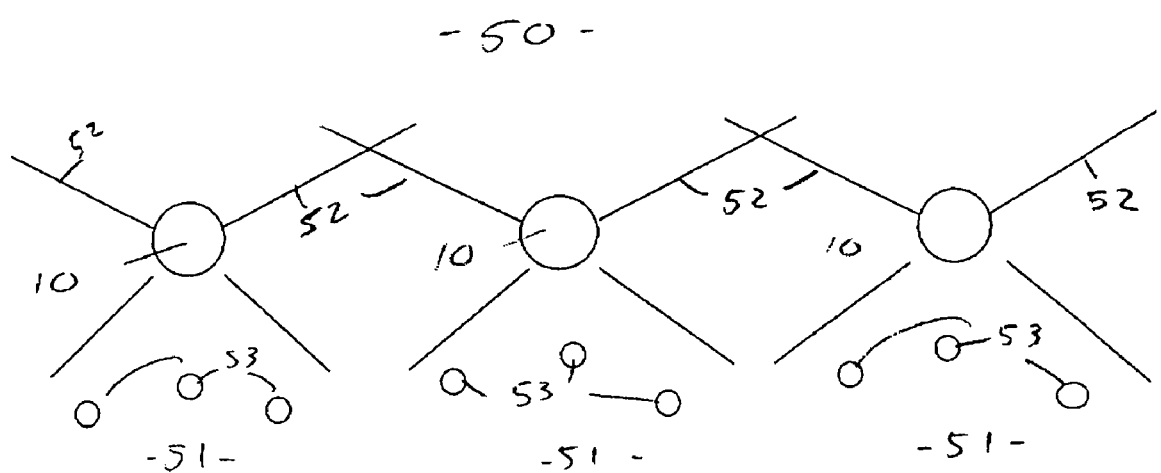
FIG. 2 is a plan view of multiple systems of the invention.

While a single housing 1 is depicted, a number of housings can be used to cover a larger area. For example, if one housing can cover a 30 foot wide area, and 300 foot long area needs protection, ten units could be used. Each housing can be have its own controller 9, or a central controller can be used based on feedback from each motion detector to control the various components for each housing. FIG. 2 shows an example of a layout using more than one system 10. Three systems 10 are shown that monitor an area collectively designated by the reference numeral 50. Each system is shown with lines 52 to represent the area intended to be covered by the system's touch and smell triggers. The areas identified as 51 are intended to represent the area to be protected by dispersing the foul tasting substances on the foliage 53. While the systems are aligned linearly, the systems could be configured in virtually any shape. Further, the foul tasting substance could be sprayed at area 50, or even both areas 50 and 51 if desired.

As noted above for the touch triggering, the system 10 can employ any way to store and supply the materials to be dispersed from the housing 1, including underground and above ground modes.

As such, an invention has been disclosed in terms of preferred embodiments thereof which fulfills each and every one of the objects of the present invention as set forth above and provides new and improved system for repelling and deterring animals, particularly deer, from entering an area.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of repelling an animal from an area comprising:
   a) sensing the presence of an animal in an area using a motion detector;
   b) triggering the detected animal's senses in a first predetermined sequence of touch, sound, sight, smell, and taste to repel the animal from the area and deter reentry of the animal into the area;
   c) continuously monitoring the area using said motion detector; and
   d) repeating said triggering step in a second sequence different from said first predetermined sequence when said motion detector is activated within a predetermined period of time from the initial detection of an animal.

2. The method of claim 1, wherein the animal's sense of touch is triggered by directing a water and/or air spray at the animal.

3. The method of claim 1, further comprising flashing a strobe light in a direction of detection of the animal to trigger the sense of sight in the animal.

4. The method of claim 1, wherein the animal's sense of taste is triggered by spraying foliage in or near the area with a foul-tasting substance.

5. The method of claim 1, wherein the animal's sense of hearing is triggered by emitting sound in a direction of detection of the animal.

6. The method of claim 1, wherein the animal's sense of smell is triggered by emitting a scent in a direction of detection of the animal.

7. The method of claim 1, wherein further detections of an animal within the predetermined period of time initial further sequences of triggering steps, each sequence different in order from a previous sequence.

8. The method of claim 1, wherein the animal's sense of touch is triggered by directing a water and/or air spray at the animal, the animal's sense of sight is triggered by shining a light in a direction of detection of the animal, the animal's sense of taste is triggered by spraying foliage in or near the area with a foul-tasting substance, the animal's sense of hearing is triggered by emitting sound in a direction of detection of the animal, and the animal's sense of smell is triggered by emitting a scent in a direction of detection of the animal.

9. The method of claim 8, wherein the foul-tasting substance is a deer-hating substance, and the scent is a scent of an animal that is predatory to deer.

10. A method of repelling an animal from a location comprising:
    a) securely positioning a housing at the location for repelling the animal;
    b) monitoring a predetermined area around the location using a motion detector connected to a controller, said motion detector transmitting a first signal to said controller corresponding to the presence of the animal in the area for repelling the animal to determine the presence of an animal in the area;
    c) alerting senses of sight, sound, touch, smell, and taste of the animal in a predetermined sequence to repel the animal from the area;
    d) continuously monitoring the area with said motion detector;
    e) generating another signal by said motion detector corresponding to the presence of an animal in the area;
    f) monitoring the time between signals generated by said motion detector with said controller; and
    g) cycling through the alerting of the senses of sight, sound, touch, smell, and taste of the animal with said controller in various predetermined sequences according to the time between signals generated by said motion detector.

11. The method as described in claim 10, wherein step a) further comprises:
    inserting a stake shaped end of said housing into a ground surface.

12. The method as described in claim 10, wherein step c) further comprises:
    transmitting a signal from said controller to a sprayer to generate a physical force from said sprayer for a predetermined period of time to trigger the animal's sense of touch.

13. The method as described in claim 12, further comprising:
    actuating an oscillating arm of said sprayer to generate said physical force in the predetermined area.

14. The method as described in claim 10, wherein step c) further comprises:
    transmitting a signal from said controller to a light source to activate said light source for a predetermined period of time to trigger the animal's sense of sight.

15. The method as described in claim 10, wherein step c) further comprises:
    transmitting a signal from said controller to a scent sprayer to activate said scent sprayer for a predetermined period of time to trigger the animal's sense of sight.

16. The method as described in claim 10, wherein step c) further comprises:
    transmitting a signal from said controller to a sound generating device having a speaker to activate said sound generating device for a predetermined period of time to trigger the animal's sense of hearing.

17. The method as described in claim 10, wherein step c) further comprises:

transmitting a signal from said controller to a plurality of sprayer heads pointed to surrounding foliage, said sprayer heads dispersing foul tasting liquid on to the foliage to trigger the animal's sense of taste.

* * * * *